United States Patent
Zhang et al.

(10) Patent No.: US 8,622,223 B2
(45) Date of Patent: Jan. 7, 2014

(54) MEMBRANE ASSEMBLIES AND METHODS OF MAKING AND USING THE SAME

(75) Inventors: Anping Zhang, Rexford, NY (US); Azar Alizadeh, Wilton, NY (US); Joleyn Eileen Balch, Schaghticoke, NY (US); Rui Chen, Clifton Park, NY (US); Anthony John Murray, Lebanon, NJ (US); Vicki Herzl Watkins, Alplaus, NY (US); Oliver Charles Boomhower, Waterford, NY (US); Reed Roeder Corderman, Niskayuna, NY (US); Peter Paul Gipp, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 911 days.

(21) Appl. No.: 12/337,164

(22) Filed: Dec. 17, 2008

(65) Prior Publication Data

US 2010/0147762 A1    Jun. 17, 2010

(51) Int. Cl.
*B01D 71/02* (2006.01)
*B01D 69/12* (2006.01)
*B01D 63/08* (2006.01)

(52) U.S. Cl.
USPC ............ 210/500.21; 210/500.22; 210/500.25; 210/488; 210/490; 205/199; 205/324; 428/304.4; 428/312.2; 428/312.6

(58) Field of Classification Search
None
See application file for complete search history.

(56) References Cited

U.S. PATENT DOCUMENTS

| | | | |
|---|---|---|---|
| 5,137,634 A * | 8/1992 | Butler et al. ................ | 210/490 |
| 2004/0146705 A1 * | 7/2004 | Den et al. ................... | 428/312.2 |
| 2005/0061663 A1 * | 3/2005 | Chen et al. .................. | 204/295 |
| 2006/0243655 A1 | 11/2006 | Striemer et al. | |
| 2006/0278580 A1 | 12/2006 | Striemer et al. | |
| 2007/0039471 A1 | 2/2007 | Hofmann | |

* cited by examiner

*Primary Examiner* — Krishnan S Menon
(74) *Attorney, Agent, or Firm* — Jenifer Haecki

(57) ABSTRACT

A method of making a membrane assembly is provided. The method comprises forming an inorganic membrane layer disposed on a substrate, and forming a plurality of macropores in the substrate at least in part using anodization. Further, a membrane assembly is provided. The membrane assembly comprises a filtering membrane that is coupled to an anodized substrate comprising a plurality of macropores.

12 Claims, 6 Drawing Sheets

MEMBRANE ASSEMBLIES AND METHODS OF MAKING AND USING THE SAME

BACKGROUND

The invention relates to membranes, and more particularly to methods of making membrane assemblies.

Typically, membrane filters are employed in biological applications involving separation of molecules in biological fluids. Most of the membrane filters employ polymer membranes or ceramic membranes. For example, polyester, polyvinylidene fluoride, zirconium oxide, silicon carbide, alumina, are some of the materials used to make membranes. Disadvantageously, most of the existing membranes have broad pore size distribution. In other words, the size of the pores on a given membrane, or from membrane to membrane, are inconsistent and vary greatly over a large range. Due to large pore size distribution, the separation process suffers. For example, species that are intended to be retained by the filter, may pass through the filter due to large pore size distribution. Further, in case of ceramic membranes, an additional disadvantage is that these membranes are quite thick and, as a result, have relatively low throughput, thereby adversely affecting the efficiency of the filtration process. These membranes also lack the robustness desired for protein and other biomolecule processing.

Therefore, it would be desirable to provide a membrane that has uniform pore size distribution and enhanced robustness for use in virus filtration or clearance, protein fractionation, protein purification, protein desalting, and the like.

BRIEF DESCRIPTION

In one embodiment, a method of making a membrane assembly is provided. The method comprises forming an inorganic membrane layer disposed on a substrate, and forming a plurality of macropores in the substrate at least in part using anodization.

In another embodiment, a membrane assembly is provided. The membrane assembly comprises a filtering membrane that is coupled to an anodized substrate comprising a plurality of macropores.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Described herein are membrane assemblies and methods of making the same. In one or more embodiments, a membrane assembly may include a filtering membrane, which is an inorganic membrane. The filtering membrane may be coupled to an anodized substrate. The anodized substrate comprises a plurality of macropores. As used herein, the term "anodized substrate" refers to a substrate that comprises pores formed by anodization of the substrate. The pores formed by anodization may be of different shapes and sizes, such as circular pores or columnar pores. In addition, the anodized substrate may also include pores formed by etching. As used herein, the term "macropores" refers to pores in the substrate that may include pore columns and/or branched pores formed by anodization, or pores formed by standard lithography followed by etching, such as but not limited to plasma etch or wet chemical etch. The macropores may have a diameter in a range from about 1 micron to about 500 microns. As used herein, the term "pore columns" refers to pores that are columnar in shape and are formed during the anodization process. The pore columns may be formed due to selective removal of the material of the anodized substrate from determined places during processing of the membrane assembly, thereby forming a plurality of empty spaces or pore columns. The pore columns are typically arranged alternately with the columns of the material of the anodized substrate. As used herein, the term "branched pores" refers to pores that are formed in the columns of the material of the anodized substrate. The branched pores connect the pore columns to provide a continuous network of pores in the anodized substrate. In certain embodiments, the membrane assembly may have a diameter of upto about 12 inches.

Proteins and other molecules with different molecular weight may be differentiated using different pore sizes. In addition, functionalization of the pore surfaces of the filtering membrane may further adjust the effective pore size in the filtering membrane and enable the filtering membrane to differentiate molecules with similar molecular weight but different charges. In one embodiment, at least a portion of the membrane may be functionalized with a chemical, a biomolecule, an antibody, or combinations thereof.

Figure 1:
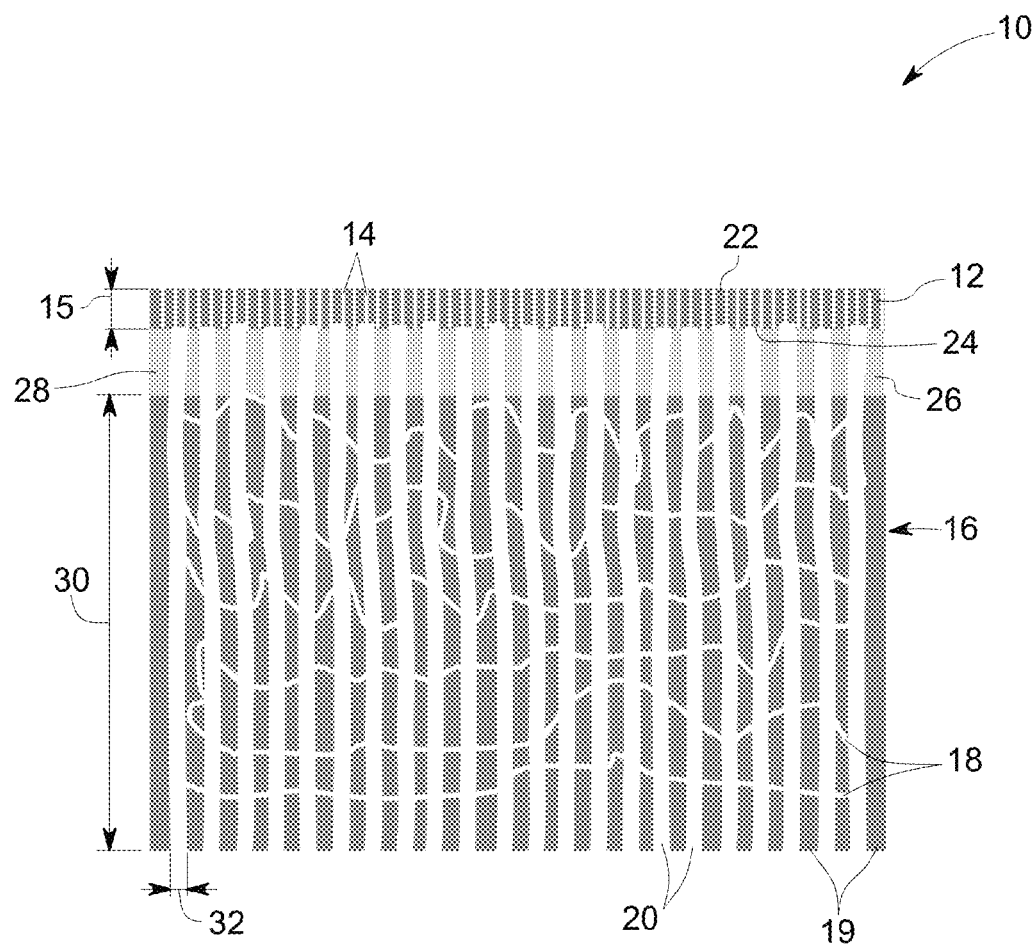
FIGS. 1-2 are cross-sectional views of embodiments of membrane assemblies, in accordance with embodiments of the present technique.

FIG. 1 illustrates a membrane assembly 10 comprising a filtering membrane 12 having a plurality of pores 14. In one embodiment, the filtering membrane 12 has a diameter of about 12 inches. In one embodiment, the size of the pores 14 may be in a range from about 5 nanometers to about 500 nanometers. In one embodiment, the size of the pores 14 may be in a range from about 10 nanometers to about 50 nanometers. The thickness 15 of the filtering membrane 12 may be in a range from about 10 nanometers to about 50 nanometers, from about 50 nanometers to about 100 nanometers, from about 100 nanometers to about 500 nanometers, from about 500 nanometers to about 5000 nanometers, or less than about 15 nanometers. A thin membrane 12 reduces filtration or transport resistance of the fluid through the membrane and enables high flux rate during filtration. A combination of high flux rate with narrow pore size distribution is suitable for differentiating biomolecules with similar sizes, in applications such as virus filtration or clearance from protein products, protein fractionation, protein purification, protein desalting, and the like. Accordingly, it is desirable to have a lower thickness of the filtering membrane to facilitate high flux rate. In one example, the filtering membrane 12 may be a silicon membrane having a thickness of about 40 nanometers. In another example, the filtering membrane 12 may be a silicon nitride membrane having a thickness of about 30 nanometers.

In certain embodiments, the filtering membrane 12 may be made of an inorganic material, such as silicon, or silicon nitride. The silicon nitride membrane may be amorphous in nature. The defect density in the silicon nitride membrane may be less than about 1 defect per centimeter square. In embodiments where the filtering membrane 12 is made of silicon, the membrane 12 may be formed of single crystal silicon, poly-crystalline silicon or amorphous silicon. The membrane 12 formed of Single crystal silicon may exhibit enhanced mechanical strength. Trans membrane pressure acceptable in case of single-crystal silicon membranes may be about 6.9 atmospheres for a 90 nanometers thick single crystal silicon membrane having a size of 100 microns by 100 microns. As used herein, the term "trans membrane pressure" refers to maximum pressure differential across the membrane before the membrane ruptures due to pressure experience by the membrane.

In one embodiment, the filtering membrane 12 may be coupled to an anodized substrate 16 comprising a plurality of macropores that include pore columns 20 and branched pores 18. The pore columns or membrane windows 20 enable at least a portion of the filtering membrane 12 to be exposed to the sample on both top and bottom surfaces 22 and 24, respectively, thereby acting as a bidirectional filter. The branched pores 18 connect the vertical pores or pore columns 20 to one another. The branched pores 18 connect the pore columns 20 to form a continuous network of pores in the anodized substrate 16. The pore column diameter 32 may be varied depending on the type of application of the membrane assembly 10. As used herein, the term "pore column diameter" refers to the size of the columnar pores. In one embodiment, the pore column diameter may be in a range from about 0.5 microns to about 5 microns. The decrease in the pore column diameter increases the robustness of the filtering membrane 12. Although not illustrated, in one embodiment, the macropores of the anodized substrate 16 may only comprise pore columns 20. In another embodiment, the macropores may be used to pre-filter large molecules, such as cells, etc. The branched pores 18 are typically smaller in size than the pore columns 20. In one embodiment, the diameter of the branched pores 18 may be in a range from about 0.2 microns to about 1 micron. Both the pore columns 20 and the branched pores 18 may be formed by anodization of the substrate 16. The pore network in the anodized substrate 16 increases porosity of the filtering membrane 12. The pores 14 of the filtering membrane 12 may be smaller in size than the branched pores 18 of the anodized substrate 16.

In one example, the thickness 30 of the anodized substrate 16 is in a range from about 50 micrometers to 1000 micrometers, or from about 300 micrometers to about 500 micrometers. The porosity of the anodized substrate is in a range from about 30 percent to about 90 percent, from about 40 percent to about 60 percent, or from about 50 percent to about 70 percent. In one embodiment, the porosity of the anodized substrate 16 may be equal to or greater than about 70 percent. In the illustrated embodiment, the macropores, that is the pore columns 20 and the branched pores 18 of the anodized substrate 16 may be present throughout the thickness 30 of the anodized substrate 16. The pore networks formed from the pore columns 20 and branched pores 18 increase the porosity of the anodized substrate 16 and enhance the throughput of the membrane assembly 10.

The membrane assembly 10 may further include an intermediate layer 26 disposed between the filtering membrane 12 and the anodized substrate 16. The intermediate layer 26 may include channels 28 that are continuation of the pore columns 20 of the anodized substrate 16. The intermediate layer may be made of silicon dioxide or silicon nitride, if the filtering membrane 12 is made of silicon. However, the intermediate layer may be optional if the filtering membrane 12 is silicon nitride.

Figure 2:
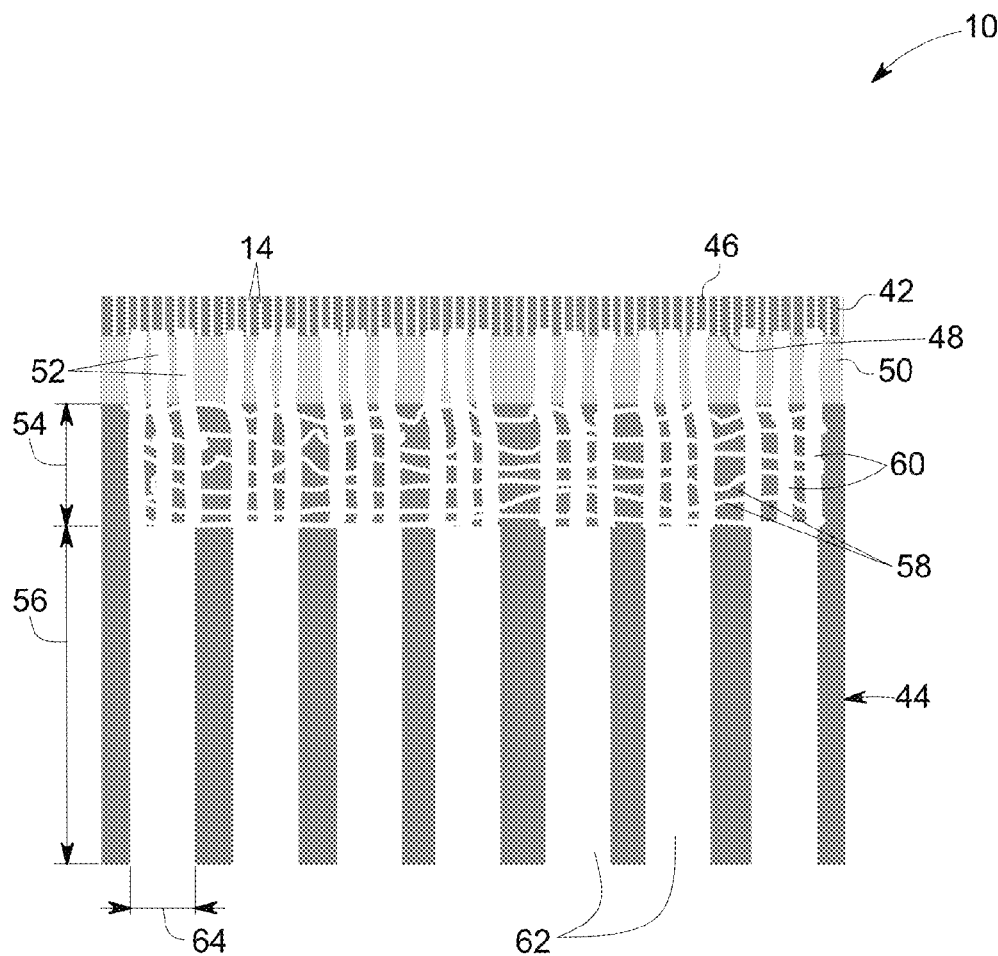

FIG. 2 is an alternate embodiment of the membrane assembly of FIG. 1. In the illustrated embodiment, the membrane assembly 40 includes a filtering membrane 42 and an anodized substrate 44. The filtering membrane 42 has a top surface 46 and a bottom surface 48. The bottom surface 48 is attached to an intermediate layer 50 having pore columns 52. The intermediate layer 50 may be made of silicon oxide or silicon nitride. The intermediate layer 50 may be optional if the filtering membrane 42 is made of silicon nitride. The intermediate layer 50 works as an etch stop layer during fabrication of the membrane assembly 40. The anodized substrate 44 may be primarily divided into two portions, namely a first portion 54 and a second portion 56. For filtering applications requiring anodized substrate 44 with greater thickness (for example to provide high mechanical strength), the increase in the porosity of the anodized substrate 44 serves to compensate at least partially for any loss in flux rate of the membrane assembly 10 caused by the greater thickness 30 of the anodized substrate 16. The diameter 64 of the pores 62 may be less than about 100 micrometers. In one embodiment, the pore diameter 64 may be reduced to less than about 100 microns. Decreasing the pore column diameter may increase the robustness of the filtering membrane. To simplify the fabrication, the bottom portion of the anodized support may be patterned with pores greater than about 5 microns by standard lithography followed by an etching step. The etching may be performed by plasma etch or wet chemicals. The first portion 54 contains a network of interconnected pores that include branched pores 58 and pore columns 60. The second portion 56 includes pores 62 having dimension 64 that is greater than the width of the pore columns 60 of the first portion 54. The large pores 62 in the second portion 56 may guide the anodization in the first portion 54 to achieve more uniform anodization. The pores 62 can also decrease overall filtration resistance in the membrane assembly 40, and may compensate for higher thickness 56 of the anodized substrate 44. The thickness 56 of the anodized substrate 44 may be kept higher to provide mechanical strength, or to suit the structural requirements of the device employing the membrane assembly 40. The distance between the pores of the anodized substrate is in a range from about 10 microns to about 100 microns, and the pore size of the pores 62 of the anodized substrate can be from 1 micron to about 1000 microns, or from about 10 microns to 100 microns. The pores 62 in the second portion can be formed by standard lithography followed by plasma etch or wet chemical etch.

In one example, the thickness of the filtering membrane is increased from about 40 nanometers to a size in a range from about 80 nanometers to about 90 nanometers to enhance the robustness of the membrane assembly. The diameter of the pore columns or the membrane window is reduced from 200 millimeters to a size in a range from about 50 millimeters to about 100 millimeters. The flux rate of such an assembly with 100 nanometers thick filtering membrane is more than 50 times higher than the flux rate of the commercially available filter membranes having the same pressure differentials, where the membrane assembly, that is the inorganic membrane has a porosity of about 25 percent and the anodized substrate has a porosity of about 50 percent. The increase in the number of membrane windows or pore columns may result in the increased total filtering area of the membrane assembly.

In certain embodiments, a method for making the membrane assembly is provided. The method may include forming an inorganic membrane layer disposed on a substrate. The inorganic layer contains a plurality of pores that may have a pore size in a range from about 5 nanometers to about 500 nanometers, or from about 10 nanometers to about 50 nanometers. The pores may be fabricated by methods such as but not limited to, self-assembly of block copolymers, or nano-imprint. Typically, block copolymers are two different polymer chains covalently bonded together on one end and molecular connectivity may force phase separation to occur on molecular-length scales. As a result, periodically ordered structures, such as cylinders, may be formed. The cylinders may be of nanometer size. The sizes and periods of the cylinders may be governed by the chain dimensions of the block copolymers. Further, the sizes and periods of the cylinders may be of the order of about 10 nanometers to about 50 nanometers. Although, structures smaller than about 10 nanometers may also be obtainable if appropriate blocks are chosen. For example, blocks of the copolymer with a high Flory-Huggins interaction parameter and decreased block lengths may be used to obtain structures smaller than about 10 nanometers.

In certain embodiments, a method of making the membrane assembly is provided. The method includes forming an inorganic membrane layer disposed on a substrate, and forming a plurality of pores in the substrate at least in part using anodization. In these embodiments, the substrate may be single-crystal silicon. In one embodiment, a conducting layer is disposed on the substrate prior to forming the plurality of pores in the substrate. This may be achieved by ion implantation followed by thermal activation. Further, an etch stop layer may be disposed on the conducting layer. This etch stop layer may be optional if the filtering membrane is made of silicon nitride. In one embodiment, a plurality of openings may be formed in the porous membrane so that the openings extend through the membrane to the underlying substrate surface. One or more of the openings may be at least partially filled with an electrically conductive material to establish one electrode for the subsequent anodization. A plurality of pores in the substrate may be formed at least in part by anodization. The process of anodization may include applying a voltage or current between the established electrode and the electrolyte.

Figure 3:
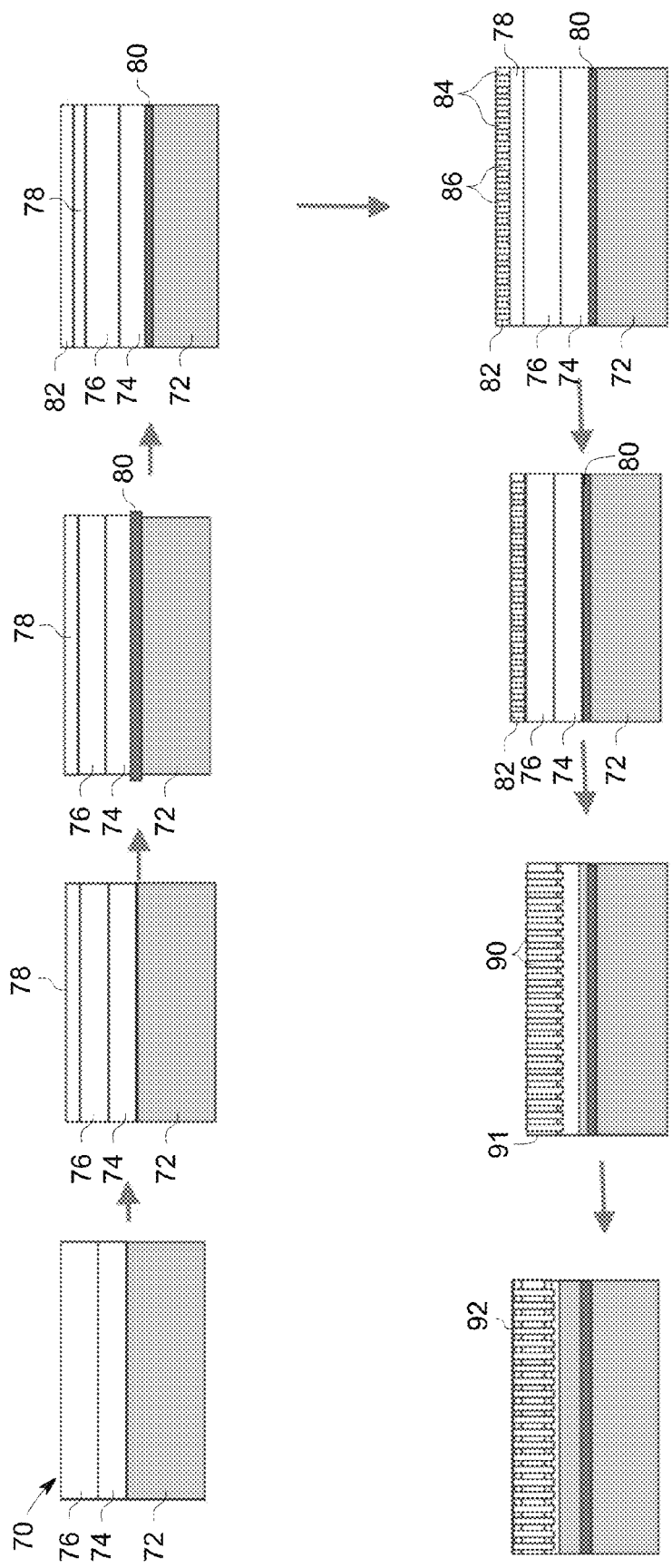
FIGS. 3-6 are cross-sectional views of steps involved in methods of making membrane assemblies, in accordance with embodiments of the present technique.

FIG. 3 illustrates steps involved in a method of making a membrane assembly. In one embodiment as illustrated in FIG. 3, a silicon-on-insulator (SOI) wafer 70 may be used to form the membrane assembly. The SOI wafer 70 includes a silicon substrate 72, a silica insulator layer 74, and a silicon layer 76 disposed on the silica insulator layer 74. The insulator 74 may act as the etch stop layer during subsequent processing. The SOI wafer 70 may be acquired from commercial sources. In one example, the SOI wafer 70 may be made by wafer bonding technique such as Smart Cut®. Alternatively, the SOI wafer may also be fabricated by SIMOX process (Separation by IMplantation of Oxygen). The silicon layer 76 of the SOI wafer 70 may be made as thin as about 20 nanometers. The diameter of the SOI wafer 70 may be up to 12-inches. In another embodiment, a silicon nitride-on-silicon wafer may be used to form the membrane assembly. The silicon nitride-on-silicon wafer includes a silicon substrate, an optional silica insulator layer, and a silicon nitride layer disposed on the silicon substrate or the silica insulator layer. The insulator may act as the etch stop layer during subsequent processing. The silicon nitride may have a stress of less than about 250 MPa, or less than about 100 MPa, or even less than about 50 MPa. The silicon nitride layer may be made as thin as about 10 nanometers. The diameter of the silicon nitride-on-silicon wafer may be upto about 12-inches. A thin silica layer 78 is then formed on the top silicon layer 76. The silica layer 78 may be formed by deposition techniques, such as but not limited to, thermal oxidation (steam oxidation or dry oxidation) in a furnace at a temperature in a range from about 900° C. to about 1200° C., sputtering, e-beam evaporation, chemical vapor deposition (CVD), such as plasma enhanced chemical vapor deposition (PECVD). The silica layer 78 may be in the form of a thin film having a thickness in a range from about 10 nanometers to about 30 nanometers. After the deposition of the silica layer 78, the SOI wafer 70 is implanted with a dopant. The dopant may be a p-type dopant or a n-type dopant. For example, the dopant may include boron (p-type dopant), phosphorus (n-type dopant), or other dopants to create a highly doped layer 80. The layer 80 may be activated by a thermal treatment to create an electrically conducting layer. In one embodiment, the electrically conducting layer may have opposite carrier than the substrate 72 such that a p-n junction may be formed. Later in the process, the electrically conducting layer provides a conductive path for anodization process and enables uniform anodization across the silicon substrate 72. In one embodiment, the existence of the p-n junction may create a depletion region in the silicon substrate 72 and add resistance to the electrical loop for anodization. This may enable more uniform anodization in the silicon substrate 72. In another embodiment, the anodization process may be self-terminated. In this embodiment, the electrical loop is disconnected inside the where the electrical conducting layer is removed by anodization macropores. This enables uniform anodization across the silicon substrate 72.

Next, one or more block copolymers are deposited on the silica layer 78 in the form of a coating 82, for example. The thickness of the block copolymer coating 82 may be in a range from about 20 nanometers to about 100 nanometers. In one example, a thickness of the block copolymer coating 82 is in a range from about 20 nanometers to about 25 nanometers. In one example, polystyrene (PS) and poly(methyl methacrylate) (PMMA) block copolymers may be deposited on the silica layer 78. In one example, polystyrene-b-poly(methyl methacrylate) (PS-b-PMMA) copolymers are employed. The size of the pores of the filtering membrane may be varied by varying the molecular weight of the block copolymers. In one embodiment, the size of the pores of the filtering membrane is in a range from about 10 nanometers to about 50 nanometers. In one example, the pore size of the filtering membrane, when using PS-b-PMMA copolymers, is about 15 nanometers.

In certain embodiments, the block copolymer coating may be annealed. The annealing may be done above the glass transition temperature of the block copolymers. The annealing above the glass transition temperature may facilitate formation of well-ordered cylinders in the block copolymer coating. In one example, the annealing may be done in vacuum at a temperature of about 130° C. Subsequent to annealing, a portion 84 of the block copolymer coating may be dissolved and the remaining portion 86 may be used for formation of pores in the underlying silica layer 78. For example, when employing polystyrene (PS) and poly(methyl methacrylate) (PMMA) block copolymers, the PMMA phase may be selectively dissolved (for example in glacial acetic acid) and the remaining PS phase may be used in the formation of the pores in the underlying silica layer 78.

Next, the selectively dissolved copolymer coating 82 may be anisotropically etched to remove portions of the underlying silica layer 78 to form pores in the silica layer 78. In one example, trifluoromethane ($CHF_3$) may be used to selectively remove silica and form pores 90 in the silica layer 78. Selective etching may be done in a Reactive Ion Etch (RIE) chamber. Subsequently, another etching treatment may be carried out to form pores 90 in the silicon layer 76 to form the filtering membrane 91. In one example, the filtering membrane 91 is formed so that the porous surface area of the membrane has a diameter up to 12-inches. In one example, the second etching may be carried out by plasma comprising a combination of hydrogen bromide, chlorine and oxygen with the silica layer 78 acting as etch mask. This step may be performed in a reactive ion etch (RIE) chamber, an Inductively Coupled Plasma (ICP) etcher, or an electron cyclotron resonance (ECR) plasma etcher, and the like.

After the formation of the pores 90 an optional protection layer 92 is deposited on the pores 90 to protect the pores 90 during anodization of the substrate 72 to form the plurality of macropores and pore columns. In one example, the protection layer 92 may be made of polymer if HF-based electrolytes are used for anodization. The thickness of the protection layer 92 is in a range from about 1 micrometer to about 50 micrometers. The protection layer 92 may be formed by spin coating followed thermal hardening.

Figure 4:
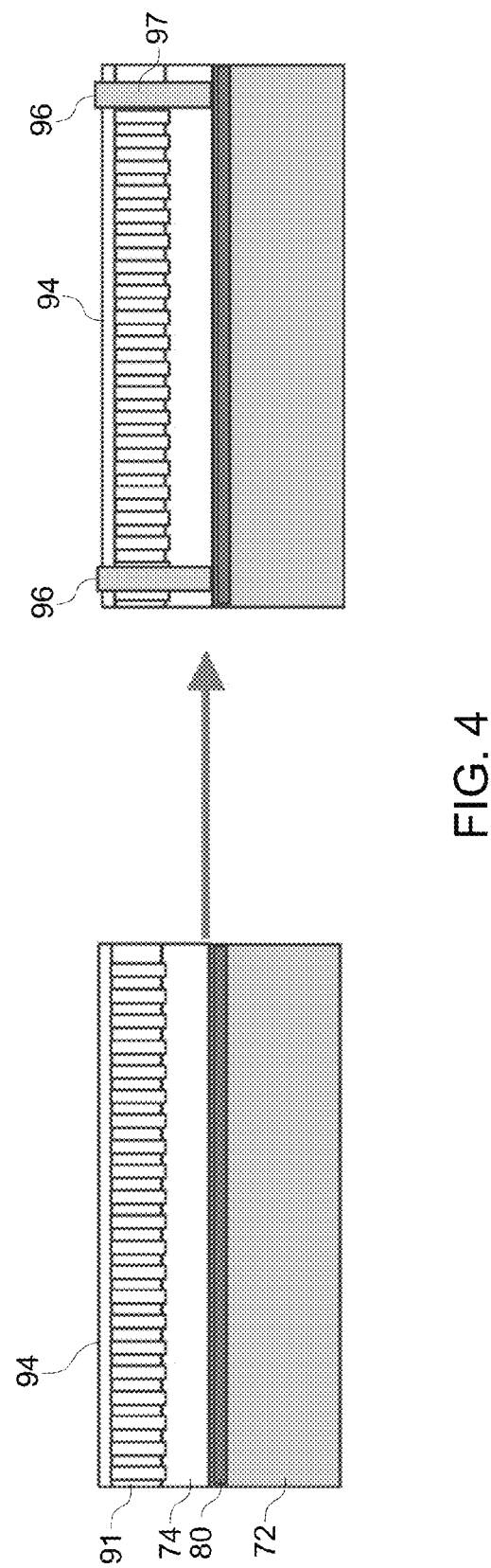

As illustrated in FIG. 4, a photoresist mask 94 may be disposed and patterned by standard lithographic techniques on the protection layer 92. The photoresist mask 94 is used to form openings 96 for electrical connections required for anodization. In the illustrated embodiment, the electrical connections may be made on the silicon substrate 72 by patterning openings 96 through the filtering membrane 91, the insulator layer 74, and stop on the electrically conducting layer 80. The openings 96 may be formed on the protection layer 92 by using standard lithography process, removal of the insulating layer 74 and filtering membrane 91 may be done either by plasma etch, or wet chemical etch. The openings 96 may be at least partially filled with an electrically conductive material 97. In one embodiment, where metal is filled in the openings 96, the metal may be deposited using deposition processes, such as but not limited to, e-beam evaporation, thermal evaporation, or sputtering.

Figure 5:
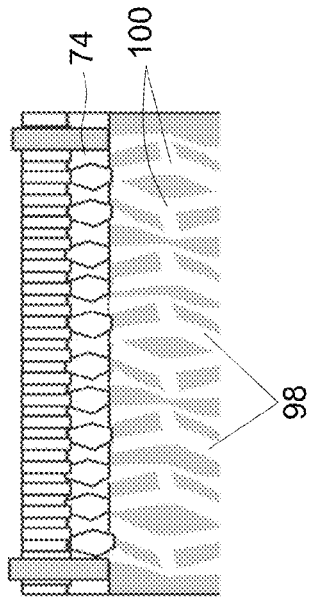
Figure 5:
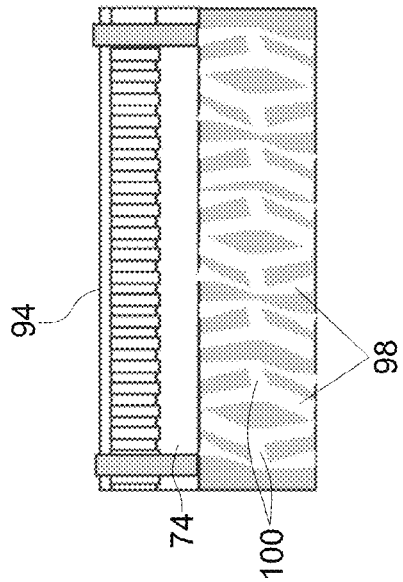

As illustrated in FIG. 5, to form pore columns 98 and branched pores 100 throughout the silicon substrate 72, the wafer may be anodized in hydrofluoric acid (HF) based solutions. Non-limiting examples of HF based solutions may include aqueous solution of HF with ethanol, an organic solution of HF with dimethyl sulfoxide (DMSO), an organic solution of HF with dimethyl formamide (DMF), hydrofluoric acid with an inorganic solution (such as Buffered Oxide Etch), or combinations thereof. The concentration and the applied current in the electrolytic cell during etching may be varied and optimized with respect to etching rate and suitability of the resulting structure. In one embodiment, the existence of the p-n junction between the electrically conducting layer and the silicon substrate may create a depletion region in the silicon substrate 72 and add resistance to the electrical loop for anodization. This may enable uniform anodization in the silicon substrate 72. In another embodiment, the anodization process may be self-terminated. During anodization, as the etching progresses, at least a portion of the insulator silica layer 74 may also get etched. However, since there is no potential across the filtering membrane 91, the filtering membrane 91 is protected from anodization. After the formation of the openings 96, the protective layer 94 may be subsequently removed by organic solvents or oxygen plasma etch.

Figure 6:
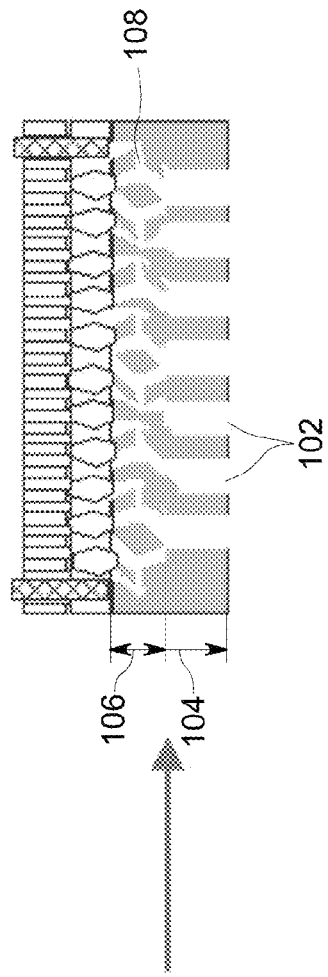
Figure 6:
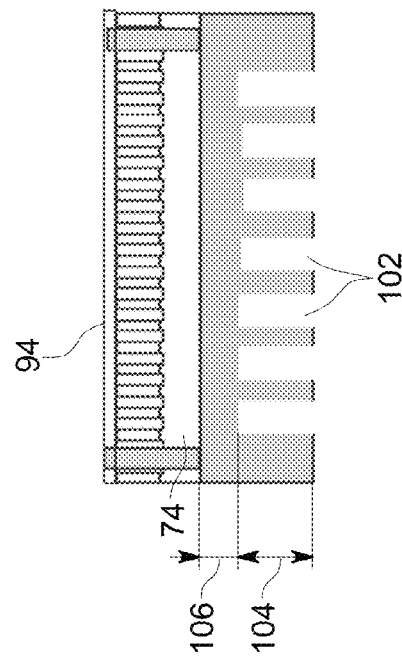

Alternatively, as illustrated in FIG. 6, patterns for macropores 102 are initially formed in a portion 104 of the substrate 72. The macropores 102 may be formed by standard lithographic techniques followed by partial etch. Non-limiting examples of partial etch may include plasma etch or wet chemicals (KOH, or TMAH). Subsequently, the remaining portion 106 of the silicon substrate 72 may be subjected to anodization to form pore network 108. The diameter of the macropores may be greater than about 1 micron, or greater than about 10 microns. Pre-patterned pores 102 assist in the anodization process and simplify anodization of the substrate 72 when the silicon substrate is thick. Anodization occurs where the electrolytes and the electrodes have smallest resistance, therefore only the portion 106 is anodized. Next, the protective silica layer 94 is removed by buffered oxide etch or diluted hydrogen fluoride.

Figure 7:
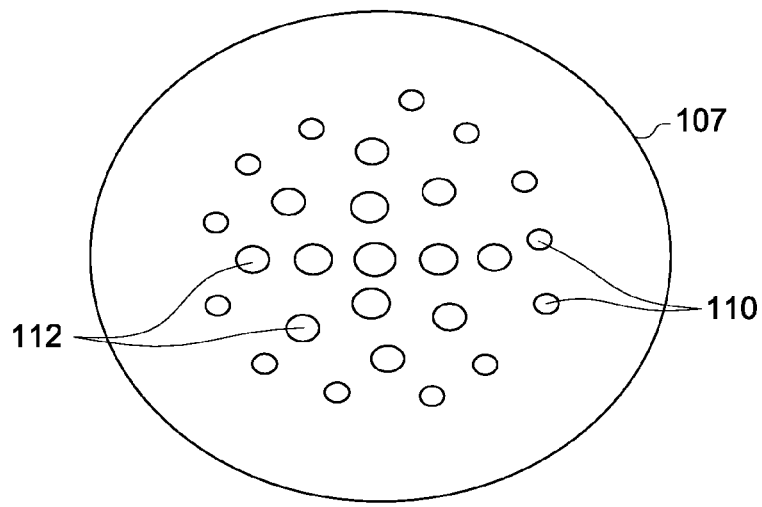
FIG. 7 is a top view of an anodized substrate having macropores, in accordance with embodiments of the present technique.

As illustrated in FIG. 7, during fabrication of the membrane assembly, guiding patterns may be formed on the bottom surface of the substrate 107 to guide the anodization process and to achieve uniform anodization in the substrate 107. That is, the guiding pattern may be formed on the surface of the substrate 107 that is opposite to the surface, which is closest to the filtering membrane. In one example, a silicon nitride layer may be deposited on the bottom surface of the substrate to form the guiding pattern in the substrate. The pattern may be formed, for example, by employing standard lithography. Subsequent to the formation of the pattern, the silicon nitride layer may be removed, for example, by plasma etch. The patterns may be designed in such a way that the patterns 112 closer to the center of the substrate 107 are larger so as to provide lower electrical resistance during anodization. Similarly, patterns 110 closer to the edge of the substrate 107 may be made smaller to provide for higher electrical resistance during anodization. This kind of distribution of the size of the pattern enables uniform current distribution during anodization so that macropores are formed throughout the volume of the substrate 107.

The filtering membrane with pores needs to be robust and strong for large-area application such as virus filtration for pilot and/or production scale. The strength of the exposed filtering membrane windows is a function of the width/diameter of the pore column or membrane window size. Typically, the membrane is stronger for smaller membrane windows. The maximum trans-membrane pressure differential can be calculated by the following equation:

$$q = 0.58 \frac{\sigma_0 h}{l} \left( \frac{\sigma_0}{E} \right)^{1/2}$$

where q is the maximum trans-membrane pressure differential, $\sigma_0$ and E are material mechanical properties, h is thickness of the filtering membrane, l is membrane window size of the filtering membrane.

Figure 8:
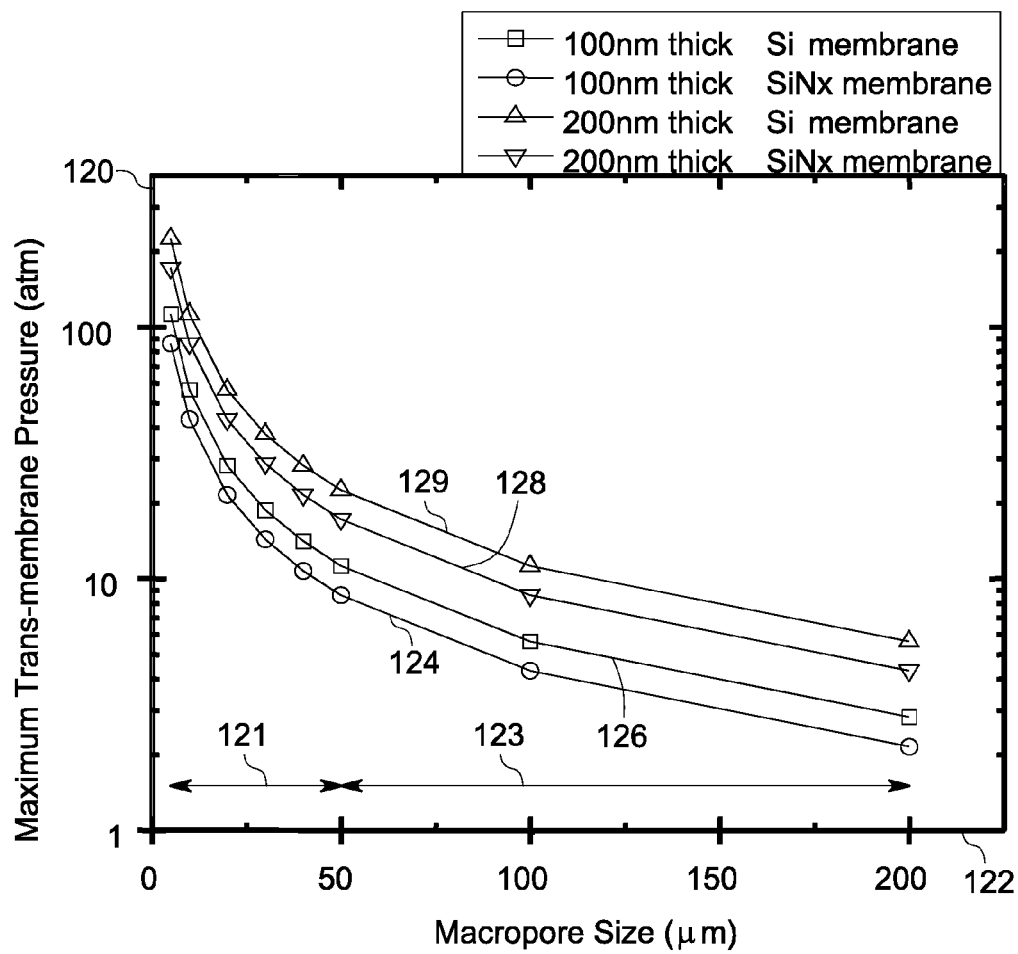
FIG. 8 is a graphical representation of trans-membrane pressure experienced by filtering membranes of various thicknesses.

FIG. 8 is a comparative study of the maximum allowable trans-membrane pressure (ordinate 120) with respect to size of the macropores (abscissa 122) in the anodized substrate for membrane assemblies employing silicon and silicon nitride filtering membranes with different thickness values. The pore size represented by the arrow 121 represents the range of pore sizes of the macropores formed during anodization. The pore size represented by the arrow 123 represents the range of pore sizes of the pores or patterns formed by patterning (such as etching and/or lithography) the substrate prior to anodization. Curves 126 and 129 represent membrane assemblies with silicon filtering membranes having thickness values of 100 nanometers and 200 nanometers, respectively. Curves 124 and 129 represent membrane assemblies with silicon nitride filtering membranes having thickness values of 100 nanometers and 200 nanometers, respectively. The size of the pores in the filtering membranes of membrane assemblies 124 and 126 is about 100 nanometers. Whereas, the size of the pores in the filtering membranes of membrane assemblies 128 and 129 is about 200 nanometers. All the four filtering membranes 124, 126, 128 and 129 have a porosity of about 50 percent.

The silicon filtering membrane 129 having the thickness of 200 nanometers and represented by the curve 129 has the maximum allowable trans-pressure values.

The membrane assembly may be employed to remove viruses during the manufacture of bio-therapeutic drug products such as biopharmaceuticals and plasma derivatives, or commercial production of therapeutic products. In one example, separation of biomolecules may include clearance of viruses from protein products. The thin but robust filtering membrane enabled by small macropores in the anodized substrate reduces the filtration resistance and increases the flux-rate of the protein products. The very narrow pore size distribution in the filtering membrane enables efficient separation of viruses from the protein products while maintaining high flux-rate of the protein products. For example, the membrane assembly having a filtering membrane with a thickness of about 100 nanometers and pore size of about 20 nanometers may provide greater than 50 to 100 times flux-rate of the protein products compared with some polymer-based virus filtering membranes.

In another example, separation of biomolecules may include protein desalting or protein fractionation and purification. As will be appreciated, efficient protein desalting is a required preparation step for many biological samples. The desalted samples may then be used for a variety of downstream proteomics applications including but not limited to mass-spectroscopy, surface plasmon resonance (SPR), electrophoresis (on-line), process analytical technologies (PAT), enzymatic assay separation, and nanowire based protein sensing. In one example, the membrane assembly may be coupled to down-stream detection technologies for in-line or on-chip desalting prior to the protein detection. The filtering membranes may provide properties that facilitate in-situ protein analysis. For example, properties such as narrow pore distribution, fast desalting rate, fast filtration rate, and minimized sample loss are some of the properties that are provided by the low thickness membranes. Conventional polymer or ceramic-based membranes suffer from slow filtration rate due to high thickness (typically greater than about 100 microns), broad pore size distribution and filtration loss within the membrane. Further, it is difficult to integrate conventional membranes for in-line or on-chip applications. The filtering membrane may be fabricated from single-crystal silicon and may be made with low thickness while having the mechanical integrity provided by the anodized substrate.

Protein purification may either involve separating one or more proteins from biological fluids or sample. Alternatively, protein purification may also refer to separating a particular type of protein from a biological fluid, such as serum. As will be appreciated, protein purification is vital for the characterization of the function, structure, and interactions of the protein of interest. The starting material is usually a biological tissue or a microbial culture. The various steps in the purification process may free the protein from a matrix that confines it, separate the protein and non-protein parts of the mixture, and finally separate the desired protein from all other proteins. Separation of one protein from all others is typically the most laborious aspect of protein purification. Separation steps exploit differences in protein size, physico-chemical properties and binding affinity. In one embodiment, at least a portion of the membrane may be functionalized to increase the affinity of the membrane for a particular type of protein, for example. Small pore size distribution of the membrane facilitates purification or desalting without losing many of the small molecular weight proteins. The membrane of the present technique is also suitable for protein fractionation. As will be appreciated, "protein fractionation" refers to division of the total biological fluid into different component parts. For example, protein fractionation may include separation of two or more types of proteins based on their molecular weight and size.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A membrane assembly comprising:
an inorganic filtering membrane;
an intermediate layer comprising silicon dioxide or silicon nitride, wherein the filtering membrane is disposed on a surface of the intermediate layer; and an anodized substrate comprising a plurality of macropores, wherein another surface of the intermediate layer is coupled to a first surface of the anodized substrate, wherein at least a portion of a second surface of the anodized substrate comprises a guiding pattern having a plurality of pre-patterned pores, and wherein the first and second surfaces are disposed opposite each other.

2. The membrane assembly of claim 1, wherein the membrane assembly has a diameter of up to about 12 inches.

3. The membrane assembly of claim 1, wherein the filtering membrane is made of silicon, or silicon nitride.

4. The membrane assembly of claim 1, wherein the filtering membrane comprises a coating to facilitate separation of biomolecules.

5. The membrane assembly of claim 1, wherein at least a portion of the filtering membrane is configured to be exposed to a fluid on two opposite surfaces.

6. The membrane assembly of claim 1, wherein at least a portion of the filtering membrane is functionalized.

7. The membrane assembly of claim 6, wherein the filtering membrane is functionalized by employing a chemical, a biomolecule, an antibody, or combinations thereof to at least a portion of the membrane.

8. The membrane assembly of claim 1, wherein a thickness of the filtering membrane is in a range from about 10 nanometers to about 500 nanometers.

9. The membrane assembly of claim 1, wherein a pore column diameter is in a range from about 0.5 microns to about 5 microns.

10. The membrane assembly of claim 1, wherein a diameter of the plurality of macropores is in a range from about 0.2 microns to about 1 micron.

11. The membrane assembly of claim 1, wherein a porosity of the substrate is in a range from about 50 percent to about 80 percent.

12. The membrane assembly of claim 11, wherein the porosity of the substrate is equal to or greater than about 70 percent.

* * * * *